(12) United States Patent
Rauchfuss et al.

(10) Patent No.: US 9,996,386 B2
(45) Date of Patent: Jun. 12, 2018

(54) MID-THREAD PRE-EMPTION WITH SOFTWARE ASSISTED CONTEXT SWITCH

(71) Applicant: Intel Corporation, Santa Clara, CA (US)

(72) Inventors: Brian D. Rauchfuss, Shingle Springs, CA (US); Naveen R. Matam, Rancho Cordova, CA (US); Michael K. Dwyer, El Dorado Hills, CA (US); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 465 days.

(21) Appl. No.: 14/338,729

(22) Filed: Jul. 23, 2014

(65) Prior Publication Data

US 2016/0026494 A1    Jan. 28, 2016

(51) Int. Cl.
*G06F 9/00* (2006.01)
*G06F 9/46* (2006.01)
*G06F 9/48* (2006.01)
*G06F 12/1081* (2016.01)

(52) U.S. Cl.
CPC ............ *G06F 9/461* (2013.01); *G06F 9/4812* (2013.01); *G06F 12/1081* (2013.01); *G06F 2212/2532* (2013.01)

(58) Field of Classification Search
CPC ....................................................... G06F 9/461
See application file for complete search history.

(56) References Cited

U.S. PATENT DOCUMENTS

| | | | |
|---|---|---|---|
| 9,384,036 B1* | 7/2016 | Barroso | G06F 9/461 |
| 2009/0327662 A1 | 12/2009 | Jiang et al. | |
| 2013/0124838 A1 | 5/2013 | Shah et al. | |
| 2013/0162661 A1 | 6/2013 | Bolz et al. | |
| 2013/0238938 A1* | 9/2013 | Baliga | G06F 11/3632 714/38.1 |
| 2014/0022263 A1 | 1/2014 | Hartog et al. | |
| 2014/0109102 A1 | 4/2014 | Duncan et al. | |

(Continued)

FOREIGN PATENT DOCUMENTS

| | | |
|---|---|---|
| CN | 106662995 A | 5/2017 |
| EP | 3172660 A1 | 5/2017 |

(Continued)

OTHER PUBLICATIONS

International Search Report and Written Opinion received for International Patent Application No. PCT/US2015/036538, dated Oct. 6, 2015, 12 pages.

(Continued)

*Primary Examiner* — Zachary K Huson
(74) *Attorney, Agent, or Firm* — Spectrum IP Law Group LLC (57) ABSTRACT

Methods and apparatus relating to mid-thread pre-emption with software assisted context switch are described. In an embodiment, one or more threads executing on a Graphics Processing Unit (GPU) are stopped at an instruction level granularity in response to a request to pre-empt the one or more threads. The context data of the one or more threads is copied to memory in response to completion of the one or more threads at the instruction level granularity and/or one or more instructions. Other embodiments are also disclosed and claimed.

25 Claims, 9 Drawing Sheets

(56) References Cited

U.S. PATENT DOCUMENTS

2014/0184617 A1 7/2014 Palmer et al.
2015/0212819 A1* 7/2015 Giroux .................. G06F 9/3832
　　　　　　　　　　　　　　　　　　　　　　712/244

FOREIGN PATENT DOCUMENTS

JP   2017-518575 A   7/2017
WO   2016/0141825 A1   1/2016

OTHER PUBLICATIONS

Communication received for European Patent Application No. 15823986.3 dated Mar. 2, 2017, 2 pages.
International Preliminary Report on Patentability received for International Application No. PCT/US2015/036538, dated Feb. 2, 2015, 9 pages.
Office Action received for Japanese Patent Application No. 2016-570317 dated Nov. 8, 2017, 6 pages including 3 pages of English translation.
Extended European Search Report received for European Patent Application No. 15823986.3, dated Feb. 20, 2018, 12 pages.

* cited by examiner

MID-THREAD PRE-EMPTION WITH SOFTWARE ASSISTED CONTEXT SWITCH

FIELD

The present disclosure generally relates to the field of electronics. More particularly, an embodiment relates to mid-thread pre-emption with software assisted context switch.

BACKGROUND

When running GPGPU (General-Purpose Computation on Graphics Processing Unit) workloads and the hardware is required for other workloads, a mechanism may be used to pre-empt or interrupt the GPGPU workload. This generally requires the completion of all existing or executing threads in the hardware in response to an interruption. This mechanism works well for threads which are expected to complete in a short amount of time. However, when threads run indefinitely or for a long duration, the response time in context switch can be very long and sometimes even cause a page fault.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some embodiments provide mid-thread pre-emption with software assisted context switch. An embodiment pre-empts or interrupts the GPGPU kernels mid-thread. The state of the system is saved and could be restored at a later point to continue execution of the preempted kernels to completion. By contrast, other solutions may rely either on completion of a work load completely or on completion of a work load at a much coarser granularity before being able to switch to a different workload.

For example, if multiple threads within a thread group are dispatched for execution, some solutions may provide a mechanism to pre-empt the dispatch at thread group boundaries only. Any dispatched threads then need to complete their tasks. This increases the response time of a GPU to critical interrupts. With mid-thread pre-emption, all threads that are already in execution mode, may be interrupted at any instruction boundary. This in turn improves the performance of switching between workloads.

As discussed herein, GPGPU refers to General-Purpose Computation on Graphics Processing Unit (GPU). The GPU may include graphics logic or other types of logic that normally perform computation(s) relating to graphics task(s), such as operation(s) that manipulate an image, frame, scene, etc., but in case of GPGPU, they are also capable of executing or performing general-purpose computation(s). While some embodiments are discussed with reference to graphics logic, embodiments are not limited to graphics related logic and may be also applied to other types of non-graphic (e.g., general-purpose) logic. Moreover, various embodiments may be performed for any type of computing device such as a desktop computer, a mobile computer (such as a smartphone, tablet, UMPC (Ultra-Mobile Personal Computer), laptop computer, Ultrabook™ computing device, smart watch, smart glasses, etc.), a work station, etc., which may be embodied on a SOC (System On Chip) platform in an embodiment.

Accordingly, some embodiments provide a highly flexible solution that could be used in other applications, e.g., where workloads need to be stopped before completion to make way for higher priority operations. Some embodiments improve the responsiveness of hardware to application requests. They also allow for the graphics logic to be multipurpose.

Figure 1:
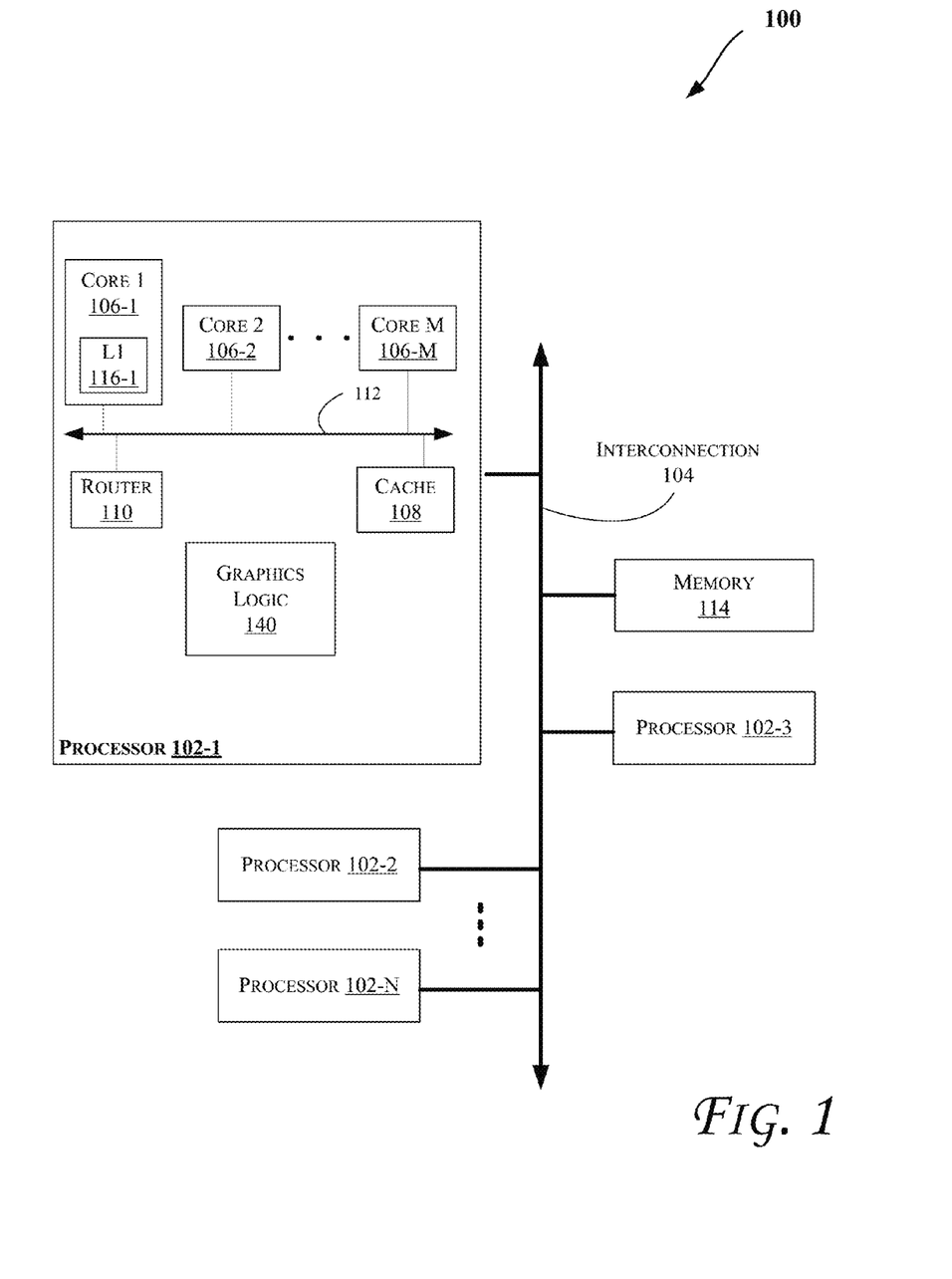
FIGS. 1 and 6-8 illustrate block diagrams of embodiments of computing systems, which may be utilized to implement various embodiments discussed herein.

Some embodiments may be applied in computing systems that include one or more processors (e.g., with one or more processor cores), such as those discussed with reference to FIGS. 1-8, including for example mobile computing devices such as a smartphone, tablet, UMPC (Ultra-Mobile Personal Computer), laptop computer, Ultrabook™ computing device, smart watch, smart glasses, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may be general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 6-8), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

As shown in FIG. 1, the processor 102 may further include graphics logic 140 to perform various graphics and/or general purpose computation(s) related operations such as discussed herein. Logic 140 may have access to one or more storage devices discussed herein (such as cache 108, L1 cache 116, memory 114, register(s), or another memory in system 100) to store information relating to operations of the logic 140, such as information communicated with various components of system 100 as discussed here. Also, while logic 140 is shown inside the processor 102, it may be located elsewhere in the system 100 in various embodiments. For example, logic 140 may replace one of the cores 106, may be coupled directly to interconnection 112 and/or interconnection 104, etc.

Generally, the state in the hardware (e.g., logic 140) may be categorized into: (a) state in fixed function hardware; (b) state of the threads (i.e., registers and Instruction Pointer, etc.); and (c) SLM (or Shared Local Memory, which refers to memory that is used by graphics logic/GPU for caching/storage of intermediate results, as well as other scatter/gather operations that otherwise are directed to global/main memory, e.g., including buffered data to be reused frequently). For example, SLM may support operations that require different threads to share data and/or pass data between them.

Some context save and restore processes may be built into hardware as state machines, e.g., where, on a halt condition, some form of DMA (Direct Memory Access) engine/logic writes all the hardware state into memory in a predefined location, and following a predefined sequence. In an embodiment, existing controls in a programmable engine (EU or Execution Unit of graphics logic/GPU) are used to move the content of the thread to memory with assistance from software. An exception handling hardware/logic that is primarily use for debug may be extended for this purpose. Also, a kernel may jump to a system routine, which can move some context of hardware to memory.

This mechanism may be used to save the state of EU in response to an interrupt. Although, some features may already exist, they are generally limited to handling some registers only and all of thread state may not be saved. In addition, the process of system routine requires the routine to return to application routine after completion. In an embodiment, the system can exit after completing a system routine. The change is depicted in FIG. 2 which illustrates different cases for handling preemption, according to some embodiments.

Figure 2:
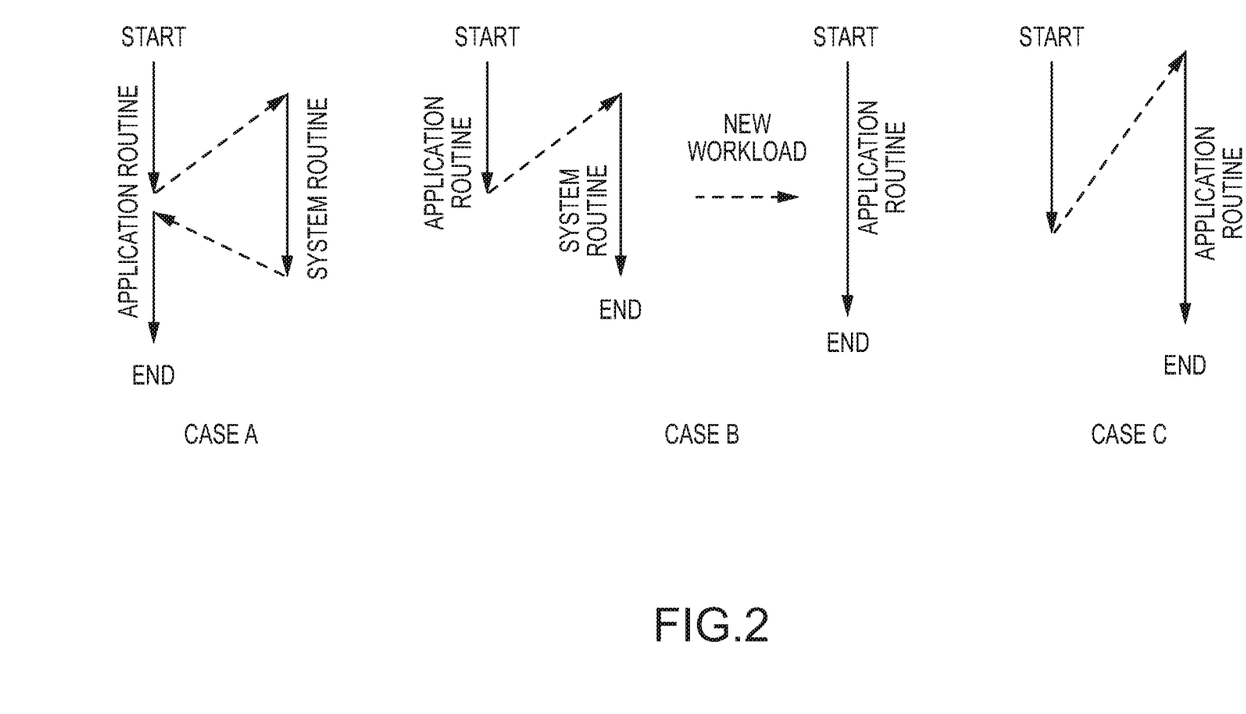
FIG. 2 illustrates sample cases for handling preemption, according to some embodiments.

Three cases are shown in FIG. 2 which are as follows:

Case A: Existing system routine handlers start from a given application routine. The new threads launched are application routine. The system routine returns to application routine for completion.

Case B: An embodiment provides a way for the system routine to complete the write operations to memory and terminate the workload without returning to application routine. This enables the launch of new workloads.

Case C: One embodiment provides a way to start a thread with a system routine and then move to application routine, which will complete the workload to termination.

Figure 3:
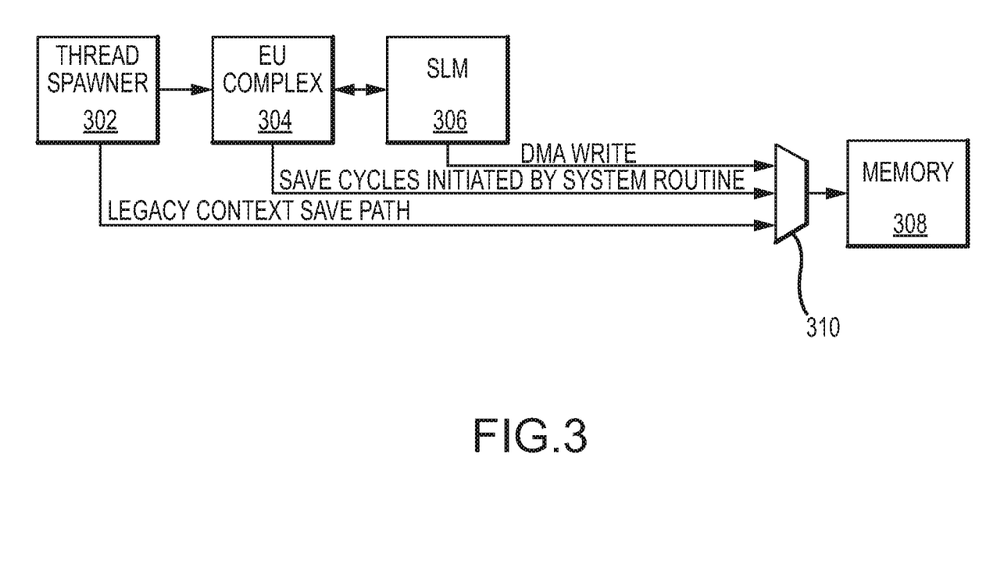
FIG. 3 illustrates a block diagram of components of graphics logic, according to an embodiment.

FIG. 3 illustrates a block diagram of components of graphics logic 140, according to an embodiment. As shown in FIG. 3, the graphics logic 140 includes a thread spawner 302 (e.g., to spawn one or more software threads, including providing a legacy context save path), an EU complex logic (e.g., including one or more execution units to execute instructions, including saving cycle data initiated by system routine), an SLM 306 (e.g., to store and handle shared local memory functions, including DMA write operations), and memory 308 (to store data relating to operations of the graphics logic 140 including SLM data from SLM 306, such as discussed herein). Memory 308 may be any type of memory such as those discussed herein with reference to FIGS. 1-8 including a cache for example. Also, a multiplexer 310 couples the memory 308 to logic 302 and 306, as well as SLM 306.

In an embodiment, the sequence of saving the graphics hardware/logic 140 state is as follows:

(a) On an interrupt, the fixed function (e.g., thread spawner logic 302) ensures no new threads are spawned into the pipeline (e.g., of the EUs in EU complex 304);

(b) The fixed function (e.g., thread spawner logic 302) requests the threads to stop execution;

(c) The threads complete any outstanding pending cycles in the pipeline and complete stops;

(d) When the system becomes idle, the threads proceed with a system routine;

(e) The system routine moves the hardware state of the threads (where all work is handled in software in an embodiment), such as intermediate registers, flow control pointers, stacks, architectural control registers, etc. to memory 308 (e.g., where the location of such a move is predetermined in one embodiment);

(f) When all threads have completed the data move, the system routine moves the control to the fixed function (which also has access to a DMA engine such as SLM 306);

(g) This DMA now moves the SLM 306 data to memory 308;

(h) When this DMA move is completed, the rest of the state, such as pipelined state, walker state, and intermediate state machines that handle barriers are all saved into context; and (i) The hardware can now flush and execute a new context.

By contrast, previous solutions involved the use of a predefined hardware state machine to handle such data movement. Per some embodiments, a new hybrid approach improves flexibility and reduces risks since a software approach is used.

Figure 4:
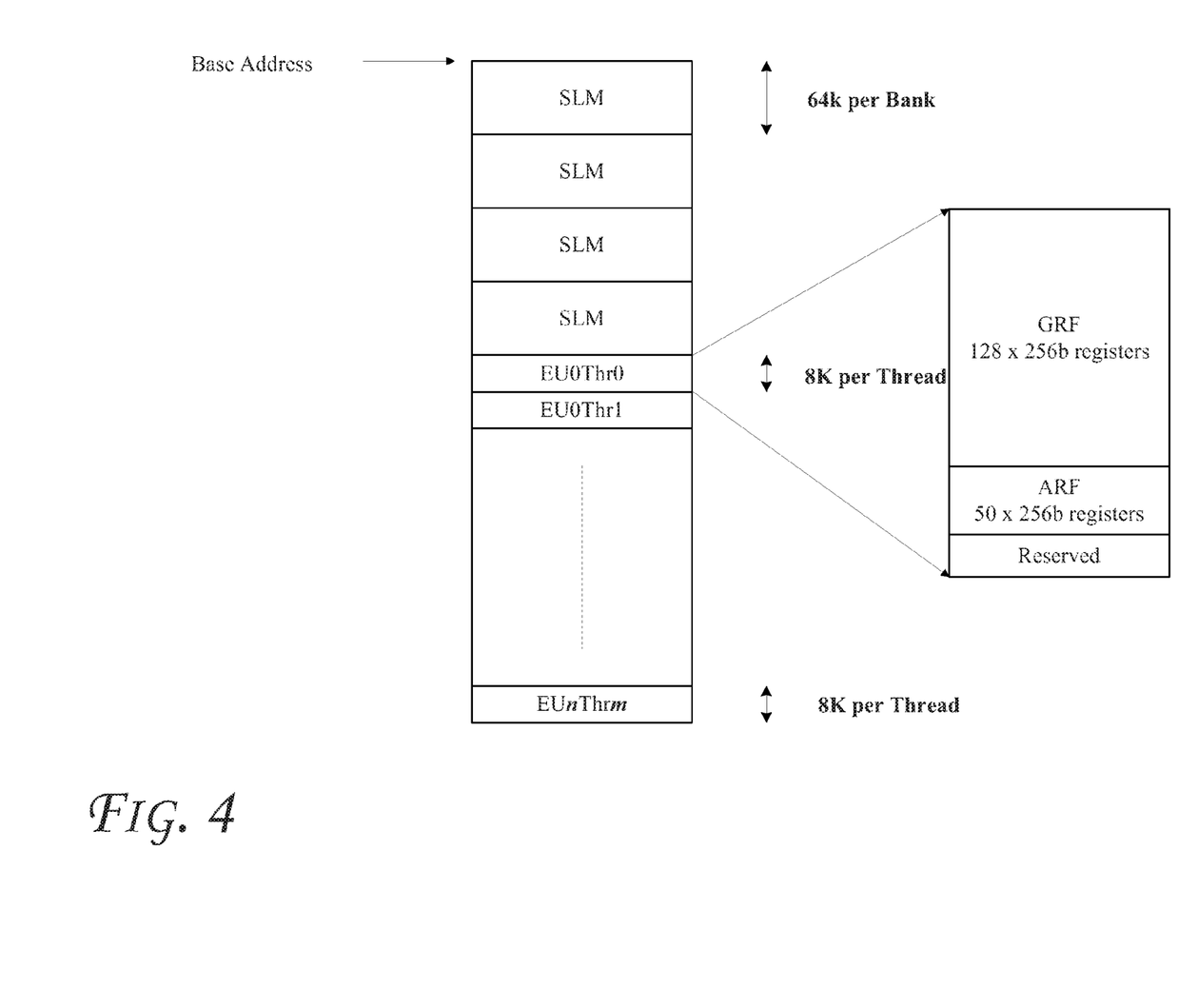
FIG. 4 illustrates a pre-determined memory map used to save and restore the context of graphics logic, according to an embodiment.

FIG. 4 illustrates a pre-determined memory map used to save and restore the context of the graphics logic 140, according to an embodiment. As shown, up to 64 KB of space is allocated per SLM. This is followed by dedicated space for each thread running on a corresponding EU. Also, the thread state is saved in a 8 KB pre-allocated space in an embodiment (which is divided into GRF (General Purpose Register File) registers, ARF (Architecture Register File) registers, and optionally some reserved space). Other pre-allocated space may be used depending on the implementation and the amount of data to be saved.

Figure 5:
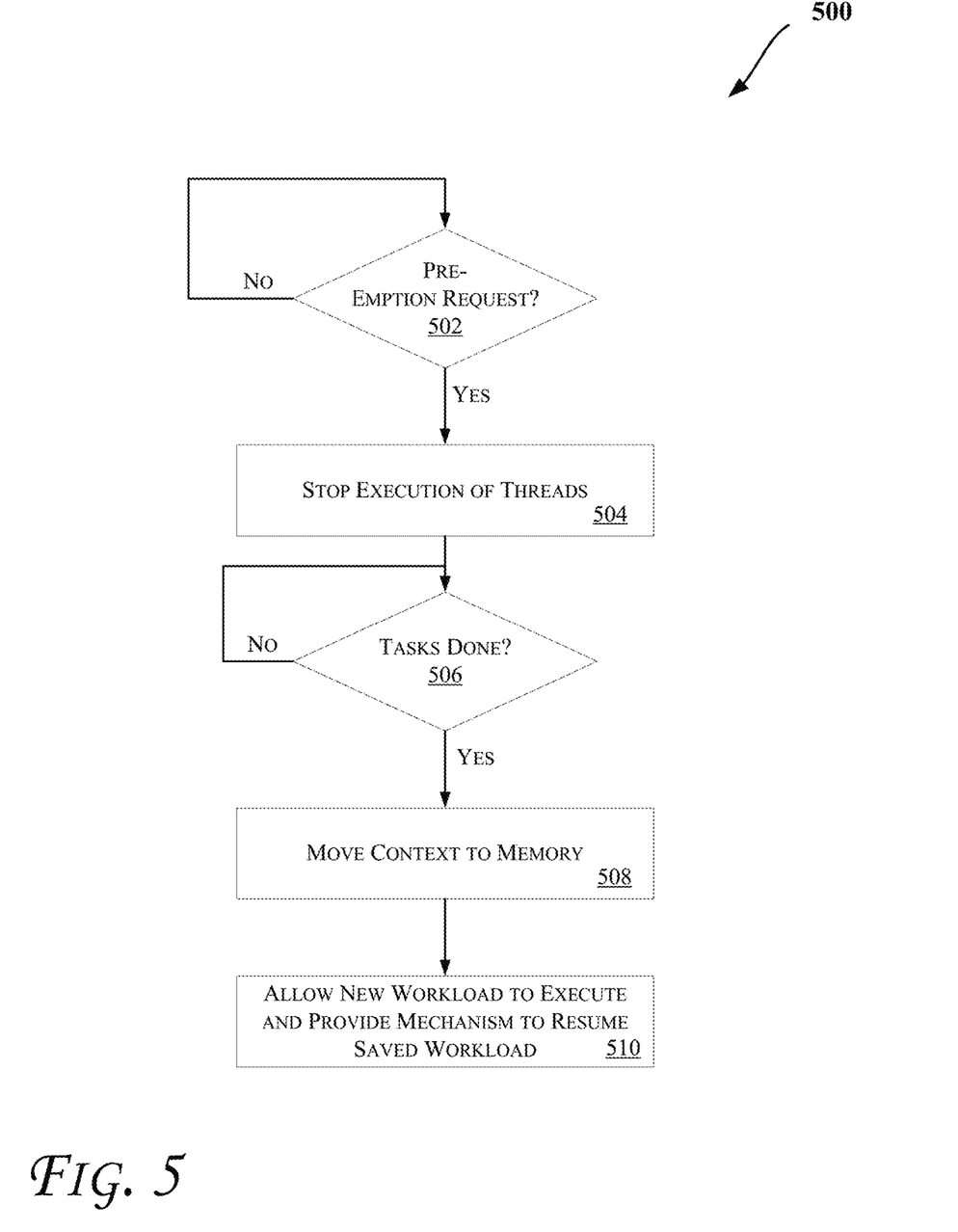
FIGS. 5 and 5A illustrate flow diagrams, according to some embodiments.

FIG. 5 illustrates a flow diagram of a method 500 to perform mid-thread pre-emption with software assisted context switch, according to some embodiments. One or more components discussed herein with reference to FIGS. 1-4 and 6-8 (including for example graphics logic 140) may be used to perform one or more operations discussed with reference to FIG. 5.

Referring to FIGS. 1-5, once a pre-emption request (e.g., mid-thread or otherwise during execution of one or more thread executing on a GPU) is detected (e.g., via an interrupt), at an operation 504, any execution of all threads in the system are stopped, e.g., at an instruction level granularity. In an embodiment, the pre-emption request indicates that other thread(s) or operation(s) are to pre-empt the execution of the currently running thread(s). The currently running thread(s) and/or the other pre-empting threads or operations may be executed as GPGPU.

At an operation 506, it is determined whether all pending tasks in the pipeline are completed (e.g., all running threads have completed their tasks at the instruction level granularity) to bring the rest of the system into idle state. At an operation 508, a hardware/software combination of mechanisms are used to move/copy the context, including thread and SLM data to memory (such as discussed with reference to FIG. 3). For example, the context data may be copied to the memory 308 in response to one or more software instructions. At an operation 510, a new workload/thread (e.g., corresponding to, or otherwise causing generation of, the pre-emption request) is allowed to execute and also a mechanism is provided to continue the saved workload from where it was previously halted (such as discussed with reference to FIG. 3).

Figure 5A:
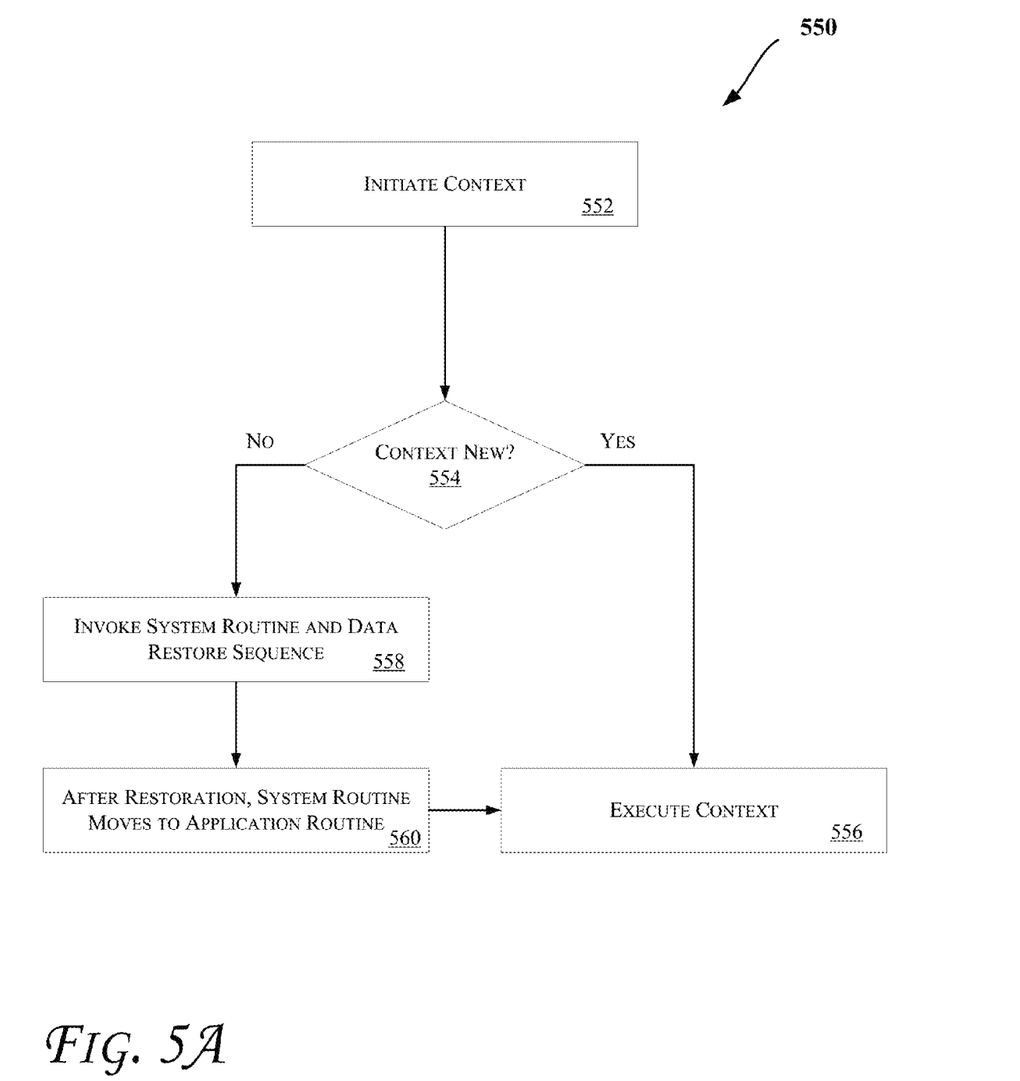

A similar sequence to the above-discussed saving sequence may be used for restoring a previously saved context. More particularly, FIG. 5A illustrates a flow diagram of a method 550 to restore a previously saved context, according to some embodiments. One or more components discussed herein with reference to FIGS. 1-5 and 6-8 (including for example graphics logic 140) may be used to perform one or more operations discussed with reference to FIG. 5A. In an embodiment, all data flow discussed with reference to FIG. 5A is from memory to hardware/logic 140.

Referring to FIGS. 1-5A, a context switch is initiated at operation 552. An operation 554 determines whether the initiated context is new. Depending on whether the context is new or previously saved, method 550 continues with operation 556 or 558-560. If the context is new, operation 556 executes the new context; otherwise, operation 558 invokes a corresponding system routine and initiates a data restore sequence for the previously saved context. At an operation 560, once the restoration is complete, the system routine moves to the next application routine. For example, after all the state information is restored, the system jumps to the application kernel pointer and continues execution to completion of the workload.

Figure 6:
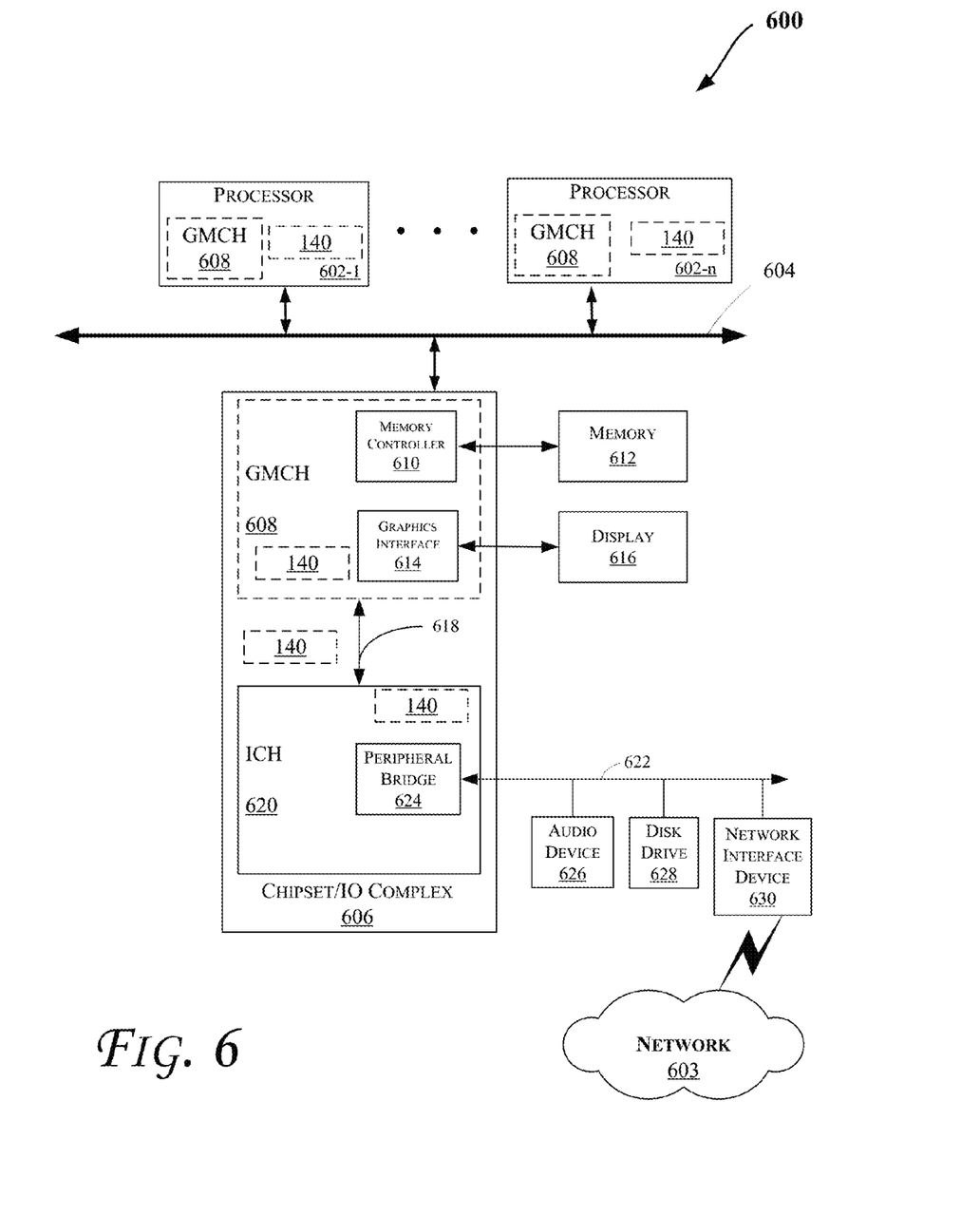

FIG. 6 illustrates a block diagram of a computing system 600 in accordance with an embodiment. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)).

Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more components of system 600 may include logic 140, discussed with reference to FIGS. 1-5. Also, the operations discussed with reference to FIGS. 1-5 may be performed by one or more components of the system 600.

A chipset 606 may also communicate with the interconnection network 604. The chipset 606 may include a graphics memory control hub (GMCH) 608, which may be located in various components of system 600 (such as those shown in FIG. 6). The GMCH 608 may include a memory controller 610 that communicates with a memory 612 (which may be the same or similar to the memory 114 of FIG. 1). The memory 612 may store data, including sequences of instructions, that may be executed by the CPU 602, or any other device included in the computing system 600. In one embodiment, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The GMCH 608 may also include a graphics interface 614 that communicates with a display device 616. In one embodiment, the graphics interface 614 may communicate with the display device 616 via an accelerated graphics port (AGP) or Peripheral Component Interconnect (PCI) (or PCI express (PCIe) interface). In an embodiment, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the GMCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments, integrated drive electronics (IDE) or small computer system interface (SCSI)

hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the GMCH 608 in some embodiments. In addition, the processor 602 and the GMCH 608 may be combined to form a single chip. Furthermore, a graphics accelerator may be included within the GMCH 608 in other embodiments.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
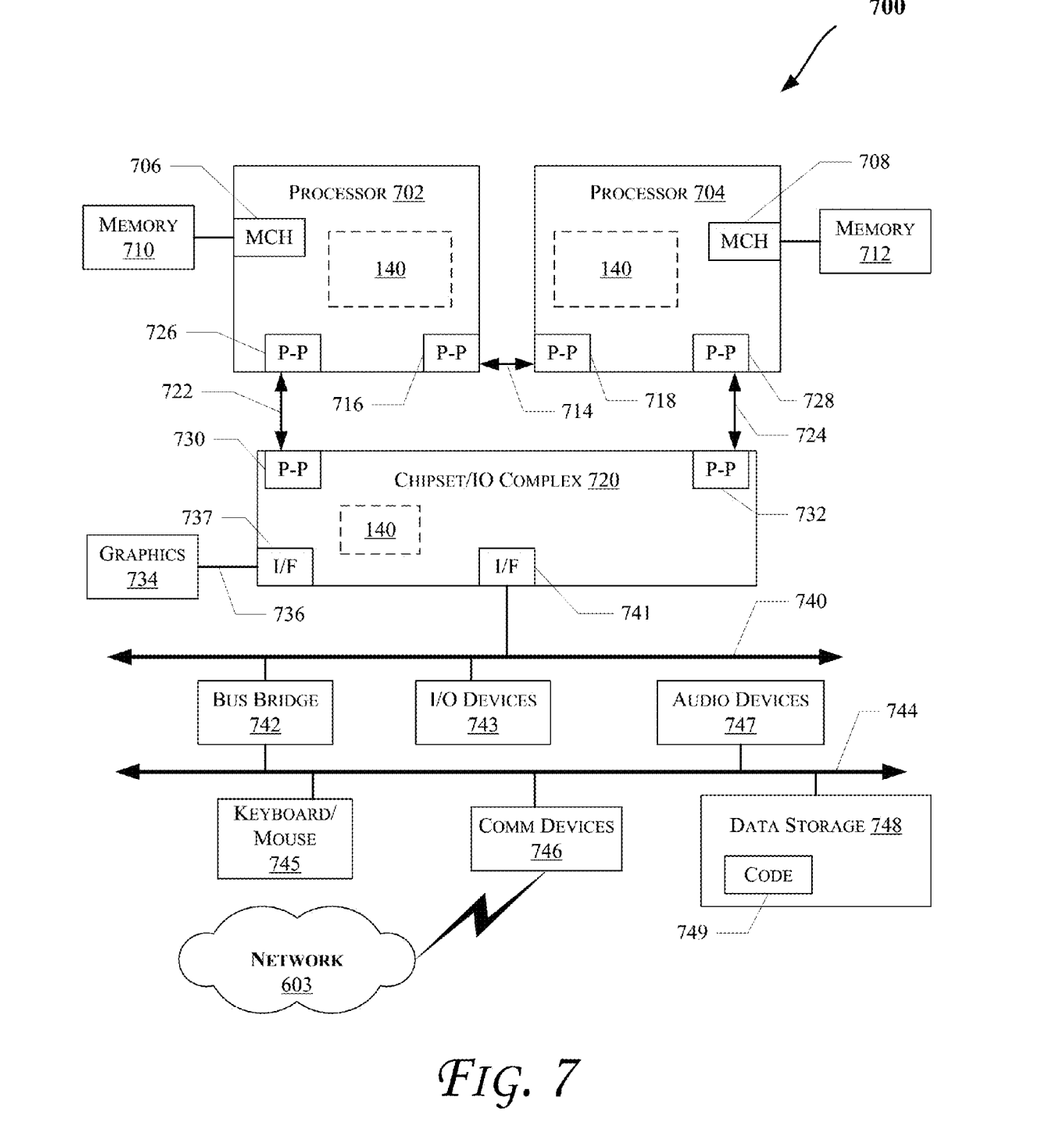

FIG. 7 illustrates a computing system 700 that is arranged in a point-to-point (PtP) configuration, according to an embodiment. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a graphics circuit 734 via a graphics interface 736, e.g., using a PtP interface circuit 737.

At least one embodiment may be provided within the processors 702 and 704. For example, one or more components of system 700 may include logic 140 of FIGS. 1-6, including located within the processors 702 and 704. Other embodiments, however, may exist in other circuits, logic units, or devices within the system 700 of FIG. 7. Furthermore, other embodiments may be distributed throughout several circuits, logic units, or devices illustrated in FIG. 7.

The chipset 720 may communicate with a bus 740 using a PtP interface circuit 741. The bus 740 may communicate with one or more devices, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device 747, and/or a data storage device 748. The data storage device 748 may store code 749 that may be executed by the processors 702 and/or 704.

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Also, the scenes, images, or frames discussed herein may be generated by art design, game design, or any kind of 3D/2D (two dimensional/three dimensional) industry design. For example, a scene may refer to a set of geometry structure and related texture maps, lighting effects, etc. Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 6 and/or 7, including for example a flat panel display device, etc.).

Figure 8:
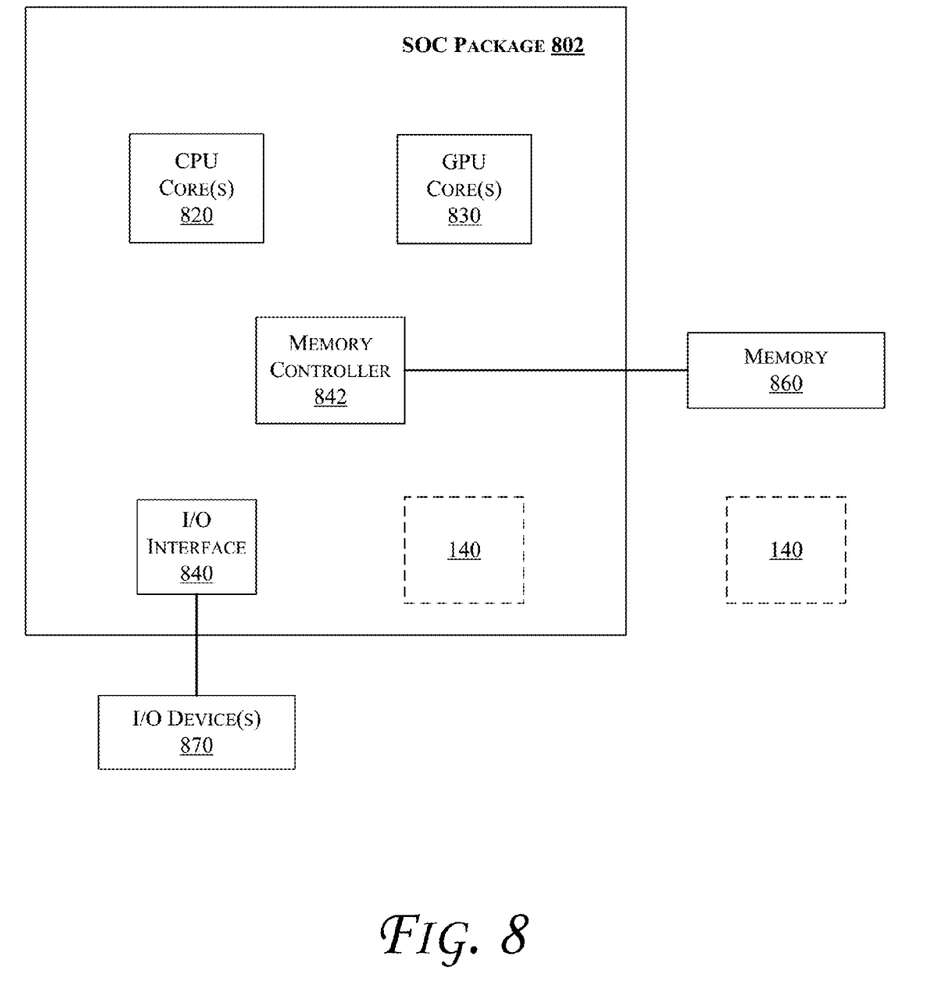

In some embodiments, one or more of the components discussed herein can be embodied as a System On Chip (SOC) device. FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 (which may be similar to or the same as memory discussed herein with reference to the other figures) via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like. Furthermore, SOC package 802 may include/integrate the logic 140 in an embodiment. Alternatively, the logic 140 may be provided outside of the SOC package 802 (i.e., as a discrete logic).

The following examples pertain to further embodiments. Example 1 includes an apparatus comprising: logic, the logic at least partially comprising hardware logic, to cause one or more threads executing on a Graphics Processing Unit (GPU) to stop at an instruction level granularity in response to a request to pre-empt the one or more threads, wherein context data of the one or more threads are to be copied to memory in response to completion of the one or more threads at the instruction level granularity. Example 2 includes the apparatus of example 1, further comprising Shared Local Memory (SLM) to store the context data prior to copying the context data to the memory. Example 3 includes the apparatus of example 2, wherein the logic is further to copy the context data from the SLM to the memory. Example 4 includes the apparatus of example 3, wherein the logic to copy the context data is to comprise a Direct Memory Access (DMA) logic. Example 5 includes the apparatus of example 1, wherein the context data of the one or more threads are to be copied to the memory in response to one or more software instructions. Example 6 includes the apparatus of example 1, wherein the logic is to cause all threads executing on the GPU to stop at the instruction level granularity in response to the request. Example 7 includes the apparatus of example 1, wherein the one or more threads or a thread corresponding to the pre-emption request are to be executed as General-Purpose Computation on Graphics Processing Unit (GPGPU) on the GPU. Example 8 includes the apparatus of example 1, comprising thread spawner logic to spawn the one or more threads. Example 9 includes the apparatus of example 1, wherein a processor is to comprise the logic. Example 10 includes the apparatus of example 1, wherein one or more of a processor having one or more processor cores, the logic, or the memory are on a single integrated circuit die.

Example 11 includes a computer-readable medium comprising one or more instructions that when executed on a processor configure the processor to perform one or more operations to: cause one or more threads executing on a Graphics Processing Unit (GPU) to stop at an instruction level granularity in response to a request to pre-empt the one or more threads, wherein context data of the one or more threads are to be copied to memory in response to completion of the one or more threads at the instruction level granularity. Example 12 includes the computer-readable medium of example 11, further comprising one or more instructions that when executed on the processor configure the processor to perform one or more operations to cause the context data of the one or more threads to be copied to the memory in response to one or more software instructions. Example 13 includes the computer-readable medium of example 11, further comprising one or more instructions that when executed on the processor configure the processor to perform one or more operations to cause all threads executing on the GPU to stop at the instruction level granularity in response to the request. Example 14 includes the computer-readable medium of example 11, wherein the one or more threads or a thread corresponding to the pre-emption request are to be executed as General-Purpose Computation on Graphics Processing Unit (GPGPU) on the GPU. Example 15 includes the computer-readable medium of example 11, further comprising one or more instructions that when executed on the processor configure the processor to perform one or more operations to cause spawning of the one or more threads.

Example 16 includes a method comprising: causing one or more threads executing on a Graphics Processing Unit (GPU) to stop at an instruction level granularity in response to a request to pre-empt the one or more threads, wherein context data of the one or more threads are copied to memory in response to completion of the one or more threads at the instruction level granularity. Example 17 includes the method of example 16, further comprising causing the context data of the one or more threads to be copied to the memory in response to one or more software instructions. Example 18 includes the method of example 16, further comprising causing all threads executing on the GPU to stop at the instruction level granularity in response to the request. Example 19 includes the method of example 16, further comprising executing the one or more threads or a thread corresponding to the pre-emption request as General-Purpose Computation on Graphics Processing Unit (GPGPU) on the GPU. Example 20 includes the method of example 16, further comprising causing spawning of the one or more threads.

Example 21 includes a system comprising: a processor having one or more processor cores; memory to store data, corresponding to at least one frame of a scene, to be accessed by at least one of the one or more processor cores; a display device to present the at least one frame of the scene; logic, the logic at least partially comprising hardware logic, to cause one or more threads executing on a Graphics Processing Unit (GPU) to stop at an instruction level granularity in response to a request to pre-empt the one or more threads, wherein context data of the one or more threads are to be copied to the memory in response to completion of the one or more threads at the instruction level granularity. Example 22 includes the system of example 21, further comprising Shared Local Memory (SLM) to store the context data prior to copying the context data to the memory. Example 23 includes the system of example 21, wherein the context data of the one or more threads are to be copied to the memory in response to one or more software instructions. Example 24 includes the system of example 21, wherein the logic is to cause all threads executing on the GPU to stop at the instruction level granularity in response to the request. Example 25 includes the system of example 21, wherein the one or more threads or a thread corresponding to the pre-emption request are to be executed as General-Purpose Computation on Graphics Processing Unit (GPGPU) on the GPU. Example 26 includes the system of example 21, comprising thread spawner logic to spawn the one or more threads. Example 27 includes the system of example 21, wherein the processor is to comprise the logic. Example 28 includes the system of example 21, wherein one or more of the processor, the logic, or the memory are on a single integrated circuit die.

Example 29 includes an apparatus comprising means to perform a method as set forth in any preceding example.

Example 30 includes machine-readable storage including machine-readable instructions, when executed, to implement a method or realize an apparatus as set forth in any preceding example.

In various embodiments, the operations discussed herein, e.g., with reference to FIGS. 1-8, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-8.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, the logic at least partially comprising hardware logic, to cause one or more threads executing on a processor to stop at an instruction level granularity in response to a request to pre-empt the one or more threads,
   wherein context data of the one or more threads are to be copied to memory in response to completion of any outstanding pending cycles of the one or more threads at the instruction level granularity, wherein no new threads are to be spawned in response to the request to pre-empt the one or more threads, wherein the one or more threads are to be stopped after completion of the outstanding pending cycles of the one or more threads at the instruction level granularity, wherein context data of the one or more threads are to be copied to the memory after the one or more threads have been stopped, wherein the context data is to originate from one of three sources comprising: thread spawner logic, an execution unit complex, or a Shared Local Memory (SLM).

2. The apparatus of claim 1, wherein the SLM is to store the context data prior to copying the context data to the memory.

3. The apparatus of claim 2, comprising logic to copy the context data from the SLM to the memory.

4. The apparatus of claim 3, wherein the logic to copy the context data is to comprise a Direct Memory Access (DMA) logic.

5. The apparatus of claim 1, wherein the context data of the one or more threads are to be copied to the memory in response to one or more software instructions.

6. The apparatus of claim 1, wherein the logic is to cause all threads executing on the processor to stop at the instruction level granularity in response to the request.

7. The apparatus of claim 1, wherein a Graphics Processing Unit (GPU) is to comprise the processor, wherein the one or more threads or a thread corresponding to the pre-emption request are to be executed as General-Purpose Computation on Graphics Processing Unit (GPGPU) on the GPU.

8. The apparatus of claim 1, comprising thread spawner logic to spawn the one or more threads.

9. The apparatus of claim 1, wherein the processor is to comprise the logic.

10. The apparatus of claim 1, wherein one or more of the processor having one or more processor cores, the logic, or the memory are on a single integrated circuit die.

11. A non-transitory computer-readable medium comprising one or more instructions that when executed on a processor configure the processor to perform one or more operations to:
   cause one or more threads executing on the processor to stop at an instruction level granularity in response to a request to pre-empt the one or more threads,
   wherein context data of the one or more threads are to be copied to memory in response to completion of any outstanding pending cycles of the one or more threads at the instruction level granularity, wherein no new threads are to be spawned in response to the request to pre-empt the one or more threads, wherein the one or more threads are to be stopped after completion of the outstanding pending cycles of the one or more threads at the instruction level granularity, wherein context data of the one or more threads are to be copied to the memory after the one or more threads have been stopped, wherein the context data is to originate from one of three sources comprising: thread spawner logic, an execution unit complex, or a Shared Local Memory (SLM).

12. The non-transitory computer-readable medium of claim 11, further comprising one or more instructions that when executed on the processor configure the processor to perform one or more operations to cause the context data of the one or more threads to be copied to the memory in response to one or more software instructions.

13. The non-transitory computer-readable medium of claim 11, further comprising one or more instructions that when executed on the processor configure the processor to perform one or more operations to cause all threads executing on the processor to stop at the instruction level granularity in response to the request.

14. The non-transitory computer-readable medium of claim 11, wherein a Graphics Processing Unit (GPU) is to comprise the processor, wherein the one or more threads or a thread corresponding to the pre-emption request are to be executed as General-Purpose Computation on Graphics Processing Unit (GPGPU) on the GPU.

15. The non-transitory computer-readable medium of claim 11, further comprising one or more instructions that when executed on the processor configure the processor to perform one or more operations to cause spawning of the one or more threads.

16. A method comprising:
   causing one or more threads executing on a processor to stop at an instruction level granularity in response to a request to pre-empt the one or more threads,
   wherein context data of the one or more threads are copied to memory in response to completion of any outstanding pending cycles of the one or more threads at the instruction level granularity, wherein no new threads are spawned in response to the request to pre-empt the one or more threads, wherein the one or more threads are stopped after completion of the outstanding pending cycles of the one or more threads at the instruction level granularity, wherein context data of the one or more threads are copied to the memory after the one or more threads have been stopped, wherein the context data originates from one of three sources comprising: thread spawner logic, an execution unit complex, or a Shared Local Memory (SLM).

17. The method of claim 16, further comprising causing the context data of the one or more threads to be copied to the memory in response to one or more software instructions.

18. The method of claim 16, further comprising causing all threads executing on the processor to stop at the instruction level granularity in response to the request.

19. The method of claim 16, wherein a Graphics Processing Unit (GPU) is to comprise the processor, the method further comprising executing the one or more threads or a thread corresponding to the pre-emption request as General-Purpose Computation on Graphics Processing Unit (GPGPU) on the GPU.

20. The method of claim 16, further comprising causing spawning of the one or more threads.

21. A system comprising:
a processor having one or more processor cores;
memory to store data, corresponding to at least one frame of a scene, to be accessed by at least one of the one or more processor cores;
a display device to present the at least one frame of the scene;
logic, the logic at least partially comprising hardware logic, to cause one or more threads executing on a processor to stop at an instruction level granularity in response to a request to pre-empt the one or more threads,
wherein context data of the one or more threads are to be copied to the memory in response to of completion any outstanding pending cycles of the one or more threads at the instruction level granularity, wherein no new threads are to be spawned in response to the request to pre-empt the one or more threads, wherein the one or more threads are to be stopped after completion of the outstanding pending cycles of the one or more threads at the instruction level granularity, wherein context data of the one or more threads are to be copied to the memory after the one or more threads have been stopped, wherein the context data is to originate from one of three sources comprising: thread spawner logic, an execution unit complex, or a Shared Local Memory (SLM).

22. The system of claim 21, wherein the SLM is to store the context data prior to copying the context data to the memory.

23. The system of claim 21, wherein the context data of the one or more threads are to be copied to the memory in response to one or more software instructions.

24. The system of claim 21, wherein the logic is to cause all threads executing on the processor to stop at the instruction level granularity in response to the request.

25. The system of claim 21, wherein a Graphics Processing Unit (GPU) is to comprise the processor, wherein the one or more threads or a thread corresponding to the pre-emption request are to be executed as General-Purpose Computation on Graphics Processing Unit (GPGPU) on the GPU.

* * * * *